(12) United States Patent
Specht (10) Patent No.: US 6,211,971 B1
(45) Date of Patent: Apr. 3, 2001

(54) METHOD AND APPARATUS TO COMPRESS MULTI-SPECTRAL IMAGES TO A SINGLE COLOR IMAGE FOR DISPLAY

(75) Inventor: Donald F. Specht, Los Altos, CA (US)

(73) Assignee: Lockheed Martin Missiles & Space Co., Sunnyvale, CA (US)

( * ) Notice: Subject to any disclaimer, the term of this patent is extended or adjusted under 35 U.S.C. 154(b) by 0 days.

(21) Appl. No.: 09/265,866

(22) Filed: Mar. 11, 1999

(51) Int. Cl.$^7$ ............... G06T 5/00; G06T 1/40; H04N 1/56

(52) U.S. Cl. .......... 358/1.9; 382/156; 382/157; 382/162; 382/167; 382/274; 345/150

(58) Field of Search ................ 382/167, 156, 382/157, 166, 162, 168, 169, 253, 254, 274; 358/1.9, 501, 518, 530, 522, 532; 345/147, 150, 153

(56) References Cited

U.S. PATENT DOCUMENTS

| | | | |
|---|---|---|---|
| 5,426,684 | | 6/1995 | Gaborski et al. . |
| 5,450,216 | * | 9/1995 | Kasson ............... 358/518 |
| 5,450,502 | * | 9/1995 | Eschbach et al. ........ 382/169 |
| 5,596,428 | * | 1/1997 | Tytgat et al. ........... 358/518 |
| 5,631,984 | | 5/1997 | Graf et al. . |
| 5,854,851 | | 12/1998 | Bamberger et al. ........ 382/274 |
| 5,929,906 | * | 7/1999 | Arai et al. ............. 358/518 |

OTHER PUBLICATIONS

Donald F. Specht, "Probabilistic Neural Networks," Neural Networks, vol. 3, pp. 109–118, 1990.

Donald F. Specht, "A General Regression Neural Network," IEEE Transactions on Neural Networks, vol. 2, No. 6, Nov. 1991.

* cited by examiner

Primary Examiner—Scott Rogers
(74) Attorney, Agent, or Firm—Swidler Berlin Shereff Friedman, LLP (57) ABSTRACT

A method and apparatus enhance visible contrast within an acquired image for display. The contrast enhancement utilizes all N bands of an original N-band spectral image to produce an M-dimensional enhanced image for display. The method creates an enhanced image from an original image in which the visible contrast in the original image is improved. The original image includes pixels, each pixel having N spectral intensities. The display or printer device which must display the relevant information may be limited to a number of bands M which is smaller than N. Maximum contrast of objects is obtained by emphasizing differences in the N-dimensional pixels by as large differences as possible within the dynamic range of the M-band display space. When M=N=3, this means moving pixels in the display space to utilize the full color palette available on a color monitor or printer. When N>M, a mapping from N space to M space must also be accomplished. In the methods of this patent, the mapping process and the spreading process are accomplished in the same algorithms. Clustering of the raw pixel data is usually used to reduce the computational requirements of the spreading step. Finally, in a creating step, an enhanced image is produced based on the N spectral intensities of each pixel and the N to M mapping developed by the algorithms.

43 Claims, 10 Drawing Sheets

"before.dat"

FIG. 3A

"after.dat"

METHOD AND APPARATUS TO COMPRESS MULTI-SPECTRAL IMAGES TO A SINGLE COLOR IMAGE FOR DISPLAY

FIELD OF THE INVENTION

The present invention relates generally to image processing techniques. In particular, the invention relates to techniques for gathering image data at N different frequencies or frequency bands and mapping the non-redundant image data into a format suitable for display on a color display screen or printer using a finite number of colors, such as combinations of red, green and blue or on a black and white display or printer as gray-scales.

BACKGROUND OF THE INVENTION

Image processing is commonly used to acquire, manipulate, store and display images. It has many useful applications, which illustratively include the areas of photographic processing, photographic restoration and enhancement, medical imaging using x-ray and other frequencies of interest, and satellite imaging for capturing features on the earth's surface, to name a few. The images acquired are typically digitized into imaging data prior to processing, either directly through the use of a digital camera or indirectly by scanning a pre-existing image.

Imaging data generally consists of an array of pixels, where each pixel represents a position on the image and a spectral profile of the position. The spectral profile is represented by an N-dimensional vector having N spectral intensities. For many applications, N is 3 and each of the three spectral intensities represents a respective intensity in the visible light portion of the spectrum, such as red, green or blue color. Combinations of red, green and blue intensities may be perceived as a large range of colors in the visible spectrum. For other applications, N may be greater or less than 3 and the respective spectral intensities may be measured within and outside of the visible portion of the electromagnetic spectrum. For example, in the case of the TMS and MAMS imaging sensors, N is 11 and includes frequencies in the infra-red portion of the electromagnetic spectrum. In the case of AVIRIS imaging data, N is 224 and includes a wide range of frequencies. AVIRIS and similar sensor data may include sufficient spectral information on the materials represented in the imaging data to allow classification of the materials.

After acquisition, imaging data may be modified to a particular display format, such a monitor or printer. The display format is generally pixel based, where each pixel represents a position on the image and includes an M-dimensional vector representing M color intensities. For color renderings, M is typically 3, with each respective color intensity being red, green or blue. For black and white renderings, M is typically one.

After an image is acquired in N-dimensional imaging data, it may be desirable to improve or enhance contrast within the image for rendering in an M-dimensional display format. For example, a photograph or other image may have poor contrast through over-exposure, under-exposure, uneven exposure, age or fading. It would be desirable to acquire the image, for example by scanning it, or its negative, in 3 dimensional red, green and blue space (N=3) and to enhance the contrast for rendering on a display or printer also having three color dimensions (M=3).

It would also be desirable to reveal and enhance contrasts present in N-dimensional imaging data in an M-dimensional display space, where N>M. This would be used to reveal contrasts between objects that are not apparent in visible light to the naked eye. For example, from an aerial view, different trees within a group of trees may appear indistinguishable in the visible spectrum because they are a similar shade of green. However, the different trees may reflect and/or emit radiation from non-visible portions of the electromagnetic spectrum differently. By choosing N spectral bands for gathering the imaging data from the trees, where at least one of the N bands is outside of the visible spectrum and is reflected differently by the trees, contrast within the gathered imaging data will exist, which can be enhanced. Choosing N bands, including bands outside of the visible spectrum, is also useful, for example, for revealing contrasts between crops that are healthy (sufficiently watered and fertilized) and those that are not, and for revealing contrasts between the boundaries of buildings, both of which may be difficult if not impossible to discern in the visible spectrum. Once contrasts are present in the acquired N-dimensional imaging data, it may be desirable to reveal or enhance those contrasts for display in an M-dimensional display format.

Conventional techniques for revealing contrasts on an M-dimensional display based on N-dimensional imaging data, where N>M include: (1) choosing M bands out of the N available bands and displaying these chosen bands in the M-dimensional space; (2) using principal component analysis of the N bands and displaying only the M most important components in the M-dimensional display format; and (3) using an ad hoc linear combination of the N bands to create imaging data in the M-dimensional display format. Each of these techniques, however, results in loss of data. In the case of technique (1), N minus M spectral bands are discarded. Therefore, a final image rendered using technique (1) may lack significant details that are present in the underlying N-dimensional imaging data. Techniques (2) and (3) may salvage more of the underlying N-dimensional imaging data than technique (1), however, as conventionally used, do not maximize use of the N-dimensional imaging data.

It would be desirable to enhance contrasts within images by making use of all non-redundant imaging data. It would further be desirable to maximize the contrast between portions of an image that appear the same color in visible light but different in at least a portion of the electromagnetic spectrum, where N is greater than or equal to M. It would further be desirable to depict objects using both visible light information and information from other portions of the electromagnetic spectrum in a way that maximizes the contrast between different objects but which nonetheless preserves as much as possible the way the objects appear in the visible portion of the electromagnetic spectrum.

SUMMARY OF THE INVENTION

According to the present invention, a method and apparatus enhance visible contrast within an acquired image for display. The method and apparatus utilize all N bands of the original N-dimensional image to produce an M-dimensional enhanced image for display.

In one embodiment of the invention, a method creates an enhanced image from an original image to improve visible contrast in the original image. The original image includes pixels, each pixel having N spectral intensities. In an assigning step, the method assigns N-dimensional prototypes based on the plurality of pixels. Then each N-dimensional prototype is related with an M-dimensional prototype. The M-dimensional prototypes define a palette of colors which are used to represent the enhanced image for display. The M-dimensional prototypes are then spread through a dynamic range in M dimensions. This step enhances contrast by spreading the "color palette" over the range of permissible colors for display. Then, in a creating step, an enhanced image is created based on the N spectral intensities of each pixel, the N-dimensional prototypes and the related M-dimensional prototypes. The enhanced image includes M color dimensions where N may be either greater than or equal to M.

After creating the enhanced image, the enhanced image may be displayed on a monitor, printed, stored in a database or transmitted over a network. In a preferred embodiment of the invention, the assigning step is performed using Vector Quantization. Also in a preferred embodiment, the spreading step spreads the M-dimensional prototypes to achieve substantial histogram equalization in M dimensions. The spreading step is amenable to several implementations, including input training using a general regression neural network (IT-GRNN), input training using a back propagation neural network (IT-BPNN), and an auto associative neural network (AANN), fuzzy logic, genetic algorithms, applied statistics and other neural networks.

An apparatus for improving visible contrast in images according to the present invention, includes input and output units, memory and a processor. The input unit receives an image comprised of pixels, each pixel having N spectral intensities. The input unit may receive the image from a camera, a database or a network. The output unit transmits an enhanced image, which has M color dimensions where $N \geq M$. The memory stores program instructions and imaging data. The processor executes the program instructions in the memory and in response the processor retrieves the image from the input unit, assigns N-dimensional prototypes based on the pixels of the image, relates each N-dimensional prototype with an M-dimensional prototype, spreads the related M-dimensional prototypes through a dynamic range in M dimensions, and creates the enhanced image based on the N spectral intensities of each pixel, the N-dimensional prototypes and an interpolation of the related M-dimensional prototypes.

BRIEF DESCRIPTION OF THE FIGURES

These and other objects, features and advantages of the invention will be more fully appreciated with reference to the detailed description and appended drawing figures.

DETAILED DESCRIPTION OF THE INVENTION

In the following sections, several embodiments of image contrast enhancement according to the present invention are illustratively described. Three different neural network approaches will be described to accomplish these objectives. The three are Input Training using the General Regression Neural Network (IT-GRNN), Input Training using the Back-Propagation Neural Networks (IT-BPNN), and the Auto Associative Neural Network (AANN). The same concept of mapping image data to a lower dimensional space and/or spreading the data to fill the display space can be expressed in terms of Fuzzy Logic, Genetic Algorithms, applied Statistics, and other neural networks.

Image Processing and Multi-Dimensional Contrast Enhancement

N co-registered spectral bands of an object captured by a camera can contain more useful information than the number of bands, M, which can be conveniently displayed on a monitor or a printer. The number of available bands is typically 3 for a color monitor or printer. However, the number may be 1 for a black and white monitor or printer, or possibly just 2 bands if one band is dedicated to overlay information, for example. What is desired is to distill as much as possible of the non-redundant information from the N spectral bands into M color planes for display, where N is greater than or equal to M. There are several methods to achieve this according to the present invention. One preferred method is to use a neural network to compress the information from N dimensions to M dimensions under the control of a fidelity constraint.

In general, the methods to be described spread the data from an N-dimensional space to fill the color palette of an M-dimensional display space where N is greater than or equal to M. The technique of histogram equalization is commonly used where N=M=1 to spread the pixel frequency evenly though the intensity range for a single image band in order to improve contrast so that details, particularly in the darker regions of an image become more perceptible. See, for example, W. K. Pratt, *Digital Image Processing,* John Wiley & Sons, New York, 1978. According to the present invention, where N>M, the embodiments described map from a higher dimensional space to a lower dimensional space. Typically the lower dimension is three so that the resulting image can be displayed on a standard 3-color monitor or printer. At the same time, M-dimensional pixels are spread out through a dynamic range to improve contrasts in the underlying image. The spreading tends to equalize the frequency distribution of the pixels in the M-dimensional display space, rather than just in gray scale as described by Pratt, and therefore may be called multi-dimensional histogram equalization. However, the spreading need not result in a true equalization in order to improve contrasts within the M-dimensional image to a desired point. The methods according to the present invention may also be applied where N=M and M is >1. In this scenario, spreading in M dimensions as described above is performed without the necessity to map from a higher dimensional space to a lower dimensional space.

Figure 1:
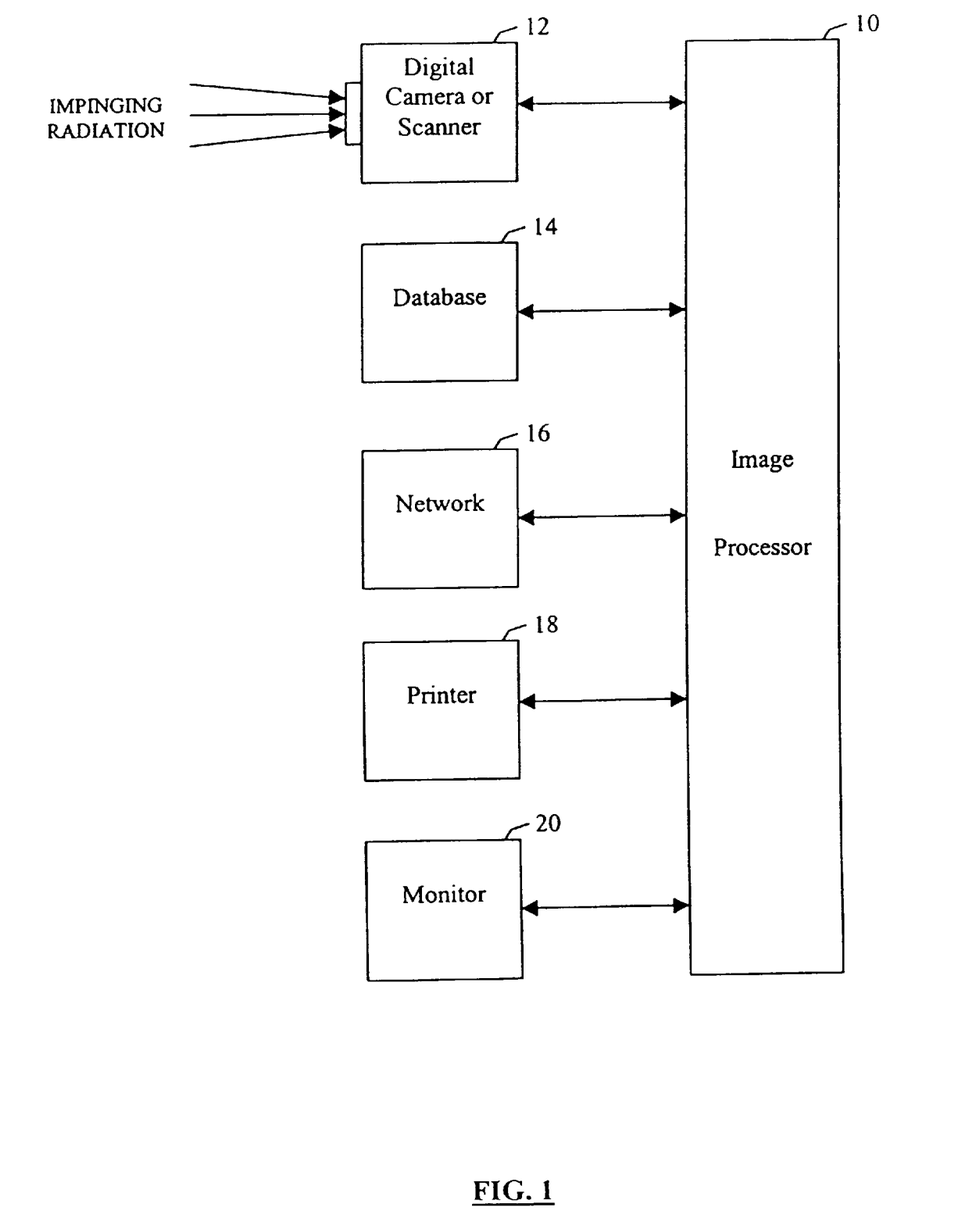
FIG. 1 depicts an image processor coupled to peripheral devices.

FIG. 1 depicts an image processor 10 in which the invention may illustratively find application. The image processor 10 is coupled to a camera or scanner 12, a database 14, a network 16, a printer 18 and a monitor 20. The camera 12 can be any camera that is operative to capture impinging radiation from a field of view. Typically the camera 12 is a digital imaging system that is equipped with N filters for determining intensities at each of N frequency or spectral bands. Any filtering technique and camera 12 may be used to gather imaging data upon which the present invention operates. The camera 12 then outputs N-dimensional pixel data. Each N-dimensional pixel of the pixel data specifies a spatial location within an image and N spectral intensities associated with the location. As an alternative to a digital camera, an ordinary camera may be used to capture photographic negatives of the field of view. In this scenario, the camera 12 may be a scanner which scans photographic negatives or prints and outputs N-dimensional pixel data of the scanned image. The camera 12 may be hand-held or mounted in a remote location, such as an airplane or a satellite.

The image processor 10 may receive imaging data in real time from the camera 12 and process the imaging data in real time for output to the monitor 20 or printer 18. Alternatively, the image processor 10 may output processed images to the database 14 or the network 16. The network 16 may illustratively include a local area or wide area network, a telecommunications network or the network of interconnected computers and computer networks known as the Internet. The image processor 10 may also receive imaging data from the database 14 or the network 16 instead of the camera 12, process the imaging data, and send the processed image to any of the output devices 14–20.

Figure 2:
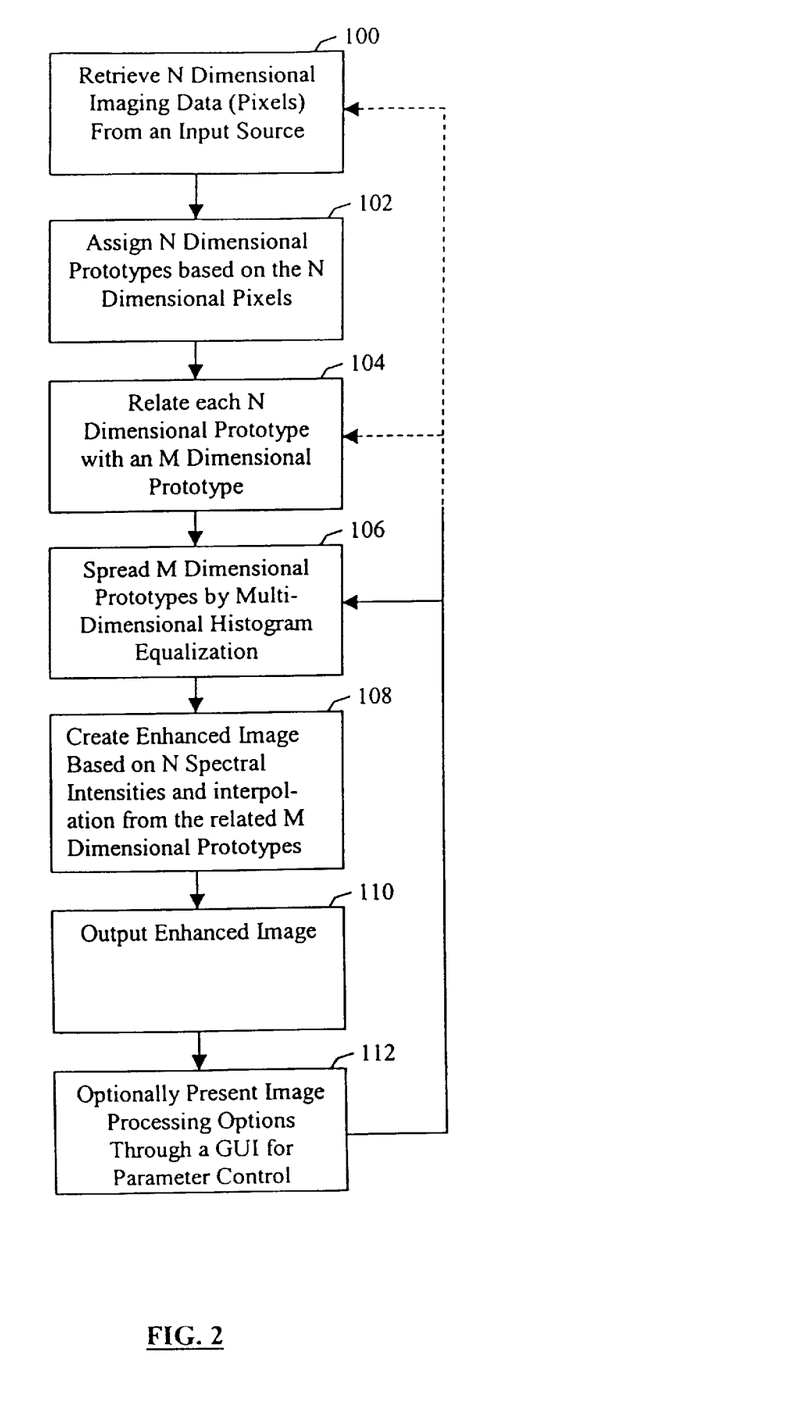
FIG. 2 depicts a method of mapping N spectral bands to M bands with contrast enhancement according to the present invention.

FIG. 2 depicts a method of enhancing contrast where N is greater than or equal to M. In step 100, the image processor 10 retrieves N-dimensional imaging data from an input source. The input source may be the camera 12, the database 14 or the network 16 and is typically N-dimensional pixel data. In step 102, the image processor 10 assigns N-dimensional prototypes based on the N-dimensional pixels. Each prototype represents an N-dimensional spectral signature (which in the visible spectrum would be called a color). The assignment in step 102 is typically made so that one prototype represents a group of pixels that have N spectral intensities that are identical or close to the N spectral intensities of the prototype. This is called clustering and any clustering technique may be used, including vector quantization and K-means clustering.

The assignment in step 102 may be made such that one prototype is assigned for each unique N-dimensional pixel or so that one prototype is representative of many unique N-dimensional pixels. Similarly, the assignment may be made by choosing random samples of the N-dimensional pixel data as prototypes representative of all of the pixels. In general, having fewer prototypes improves image processing time, particularly in neural network realizations.

In step 104, the image processor 10 relates each N-dimensional prototype with an M-dimensional prototype. This step is an initialization step for the M-dimensional prototypes. Where N=M, this step may be, but need not be, performed trivially by copying the N-dimensional prototypes as the initial values for the M-dimensional prototypes. Furthermore, where N=M, N-dimensional space may be thought of as the original image's color space, and M-dimensional space the processed image's color space. In general, the M-dimensional prototypes may be chosen arbitrarily. However, the choice affects the colors which appear in the final image. Where N>M, it may be desirable to select M values from each N-dimensional prototype for the initial values for the M-dimensional prototype. For example, where the N-dimensional prototype includes red, green and blue intensities, among others, choosing these three intensities for assignment to red, green and blue within M-dimensional space may be desirable and may result in a processed image which more closely resembles the true color image than would result from other arbitrary assignments. Similarly, where N=M, M-dimensional prototypes may be arbitrarily assigned. However, the simplest choice is to keep the M-dimensional prototypes the same as the N-dimensional prototypes.

Figure 3A:
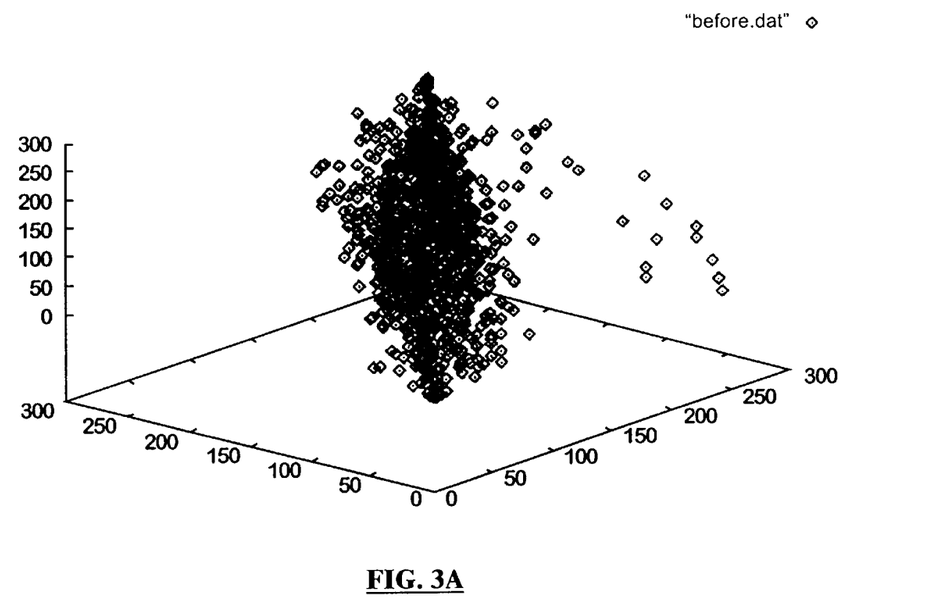
FIG. 3A depicts a scatter plot of three-dimensional raw pixel data showing that pixel intensities do not span the entire range of the red, green and blue color palette.

In step 106, the image processor spreads the M-dimensional prototypes over a dynamic range within the M-dimensional space. This spreading is depicted graphically in the scatter plots of pixel data shown in FIGS. 3A and 3B. A scatter plot of raw pixel data usually shows that pixel intensities do not span the entire range of the red, green, and blue color palette which can be displayed on a standard color monitor 20 or printer 18. Even after conventional histogram equalization of each color plane separately, the scatter plot in three dimensions may appear as shown in FIG. 3A. In this figure, there is a high correlation among the three colors. The pixel concentration is along the main diagonal of the RGB color cube or M-dimensional display space, and each point is represented as a shade of gray but with a tinge of color. For purposes of contrast enhancement, it would be desirable to spread these pixels away from the main diagonal to make better use of the full range of colors which can be displayed. If the pixel distribution in FIG. 3A were spread out to the distribution of FIG. 3B, for example, subtle differences of color would be exaggerated into larger differences of color which would make them easier to discern. There are several ways to accomplish this, which illustratively include: using neural networks, such as an input trained general regression neural network (IT-GRNN), an input trained back-propagation neural network (IT-BPNN), and an auto associative neural network (AANN); using fuzzy logic to describe how each pixel value should be changed iteratively to spread the scatter plot; using Kohonen self organizing maps; and perpendicular expansion to name a few.

Figure 3B:
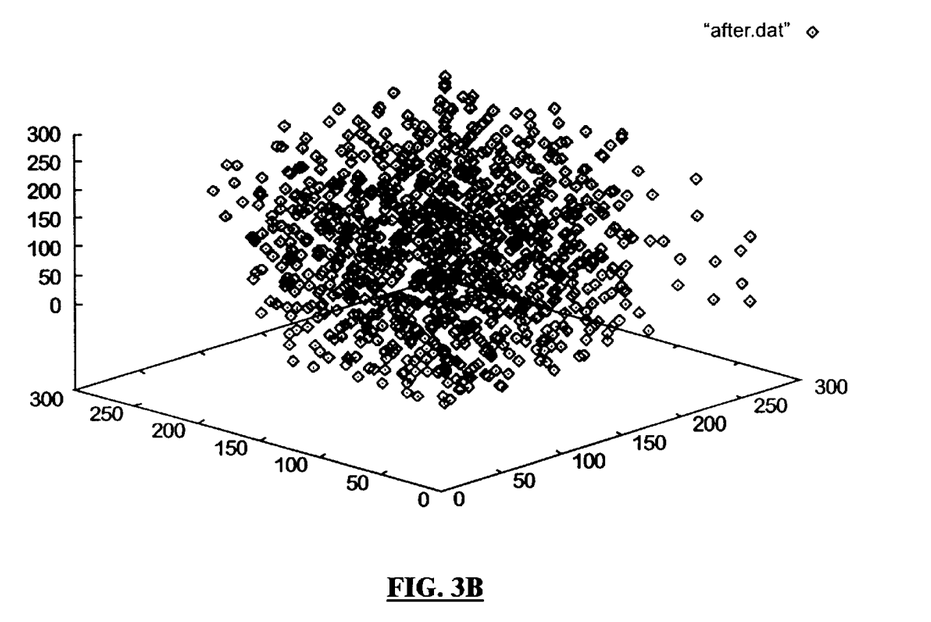
FIG. 3B depicts a scatter plot of the same pixel data showing spreading of the raw pixel data within the three dimensional color space to enhance contrast, according to the present invention.

Conventional histogram equalization applied to one color plane of raw imaging data at a time would not accomplish the desired effect. For example, the scatter plot of FIG. 3A already represents an equalized histogram in each of the three axes. The scatter plot of FIG. 3A represents the pixels from three bands of an aerial photograph of Sacramento, Calif. using an 11 band TMS system. The scatter plot of FIG. 3B represents the same data after 50 iterations of IT-GRNN (to be described later). In this case, non-redundant information from the other 8 bands was used to separate clusters of pixels which otherwise might have been indistinguishable in just the three bands of FIG. 3A. However, the same spreading effect occurs if the number of input bands N and display bands M are the same.

In step 108, the image processor 10 creates or reconstructs a new M-dimensional image based on the original N spectral intensities of each pixel and the relationship between the M and N-dimensional prototypes. More specifically, the process of spreading the M-dimensional prototypes creates a mapping between the N and M-dimensional prototypes. To create or reconstruct an image in M dimensions, the image processor 10 identifies the closest N-dimensional prototype to each N-dimensional pixel. The image processor 10 then assigns to each pixel the color of the M-dimensional prototype after spreading in step 106 that is related to the identified N-dimensional prototype. Alternatively, the image processor 10 may assign each pixel a color based on interpolation between two or more M-dimensional prototypes whose related N-dimensional prototypes are closest to the N-dimensional pixel.

In step 110, the image processor 10 outputs the M-dimensional enhanced image. The image processor 10 may output the M-dimensional image to the printer 18, the monitor 20, the database 14 or the network 16. In step 112, the image processor 10 optionally presents image processing options through a graphical user interface (GUI) to a user. The user may then alter image processing parameters and cause the image processor 10 to further process the image with new or modified parameters beginning, optionally, with step 104 or step 106 or step 100 with a new image. Parameters most likely to be altered by the user are the number of iterations, the clustering parameters to generate more or fewer clusters, or the sigma parameter in the case of neural network implementations.

The use of neural networks to spread the prototypes in M-dimensional space are described in detail in the sections that follow.

IT-GRNN Neural Network Implementation

Figure 4:
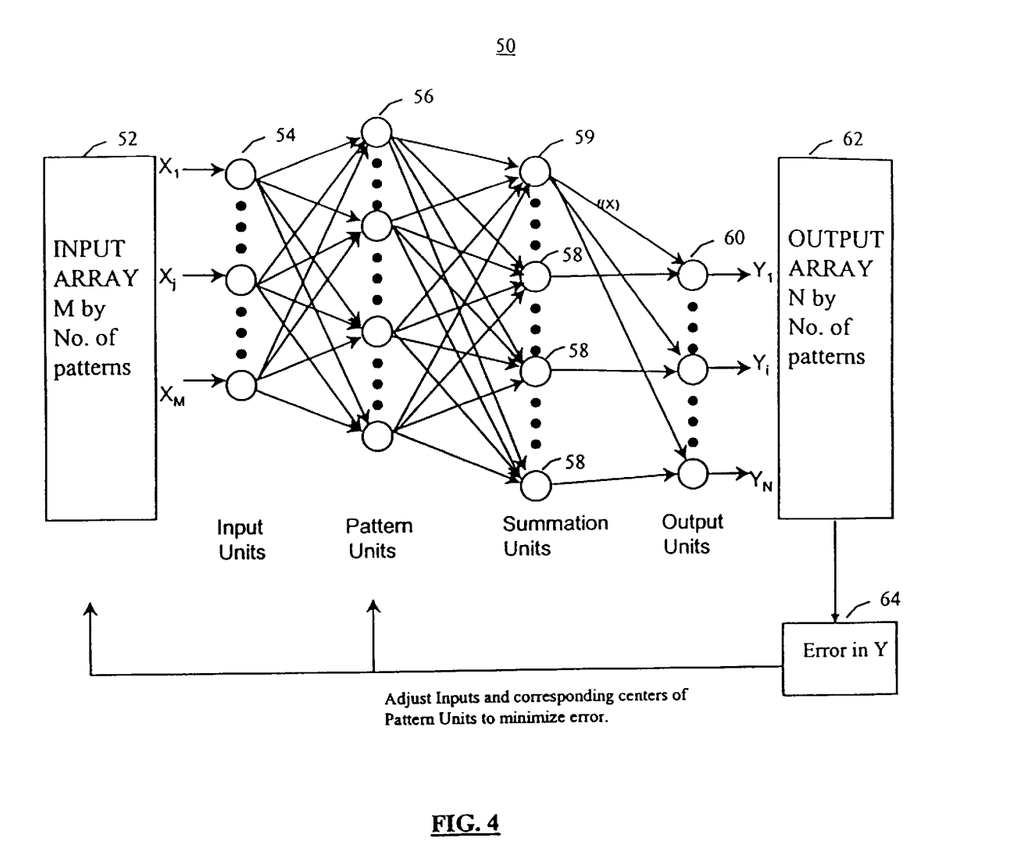
FIG. 4 depicts an Input Training General Regression Neural Network (IT-GRNN) according to the present invention.
Figure 5A:
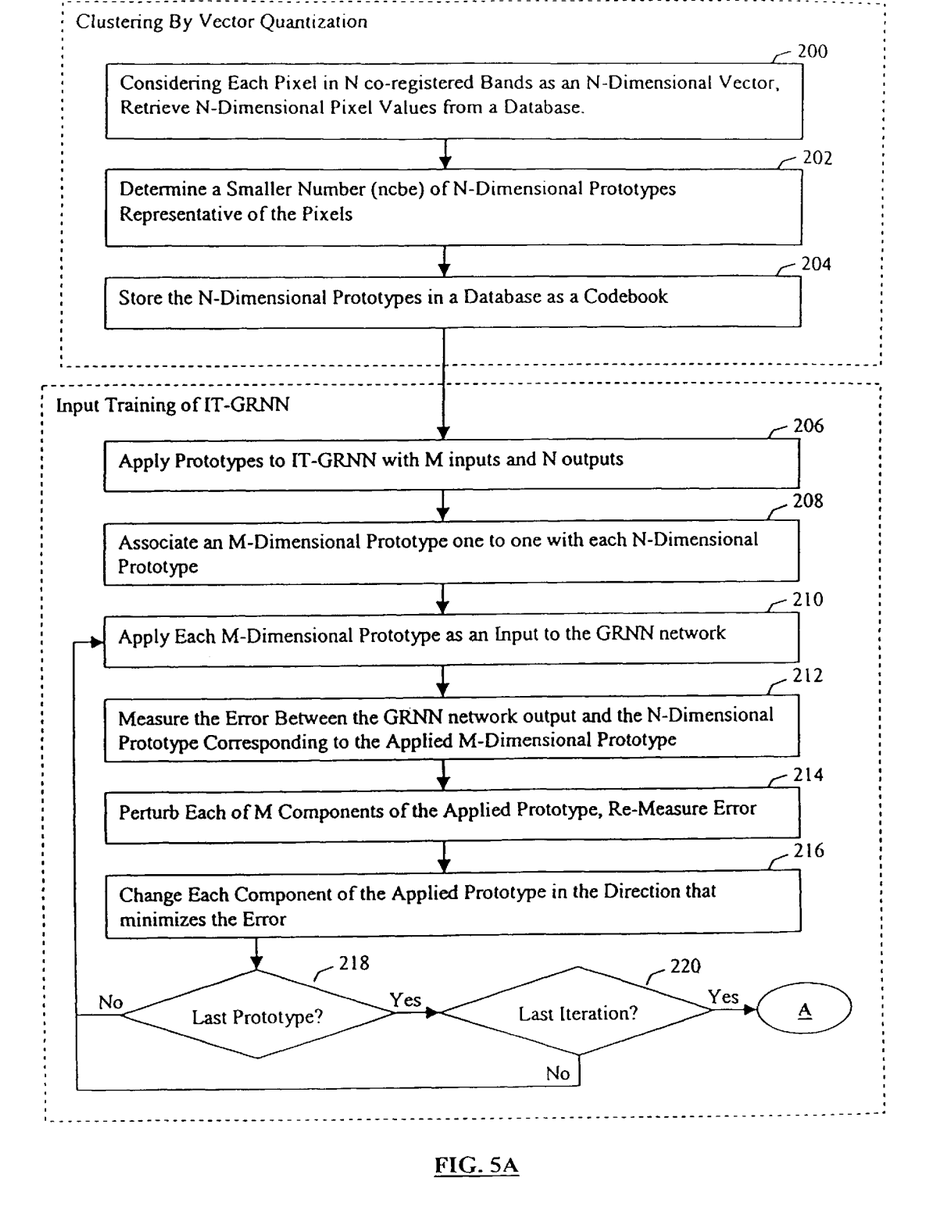
FIGS. 5A and 5B depict a method of converting an image of N spectral bands to M color bands using an IT-GRNN.
Figure 5B:
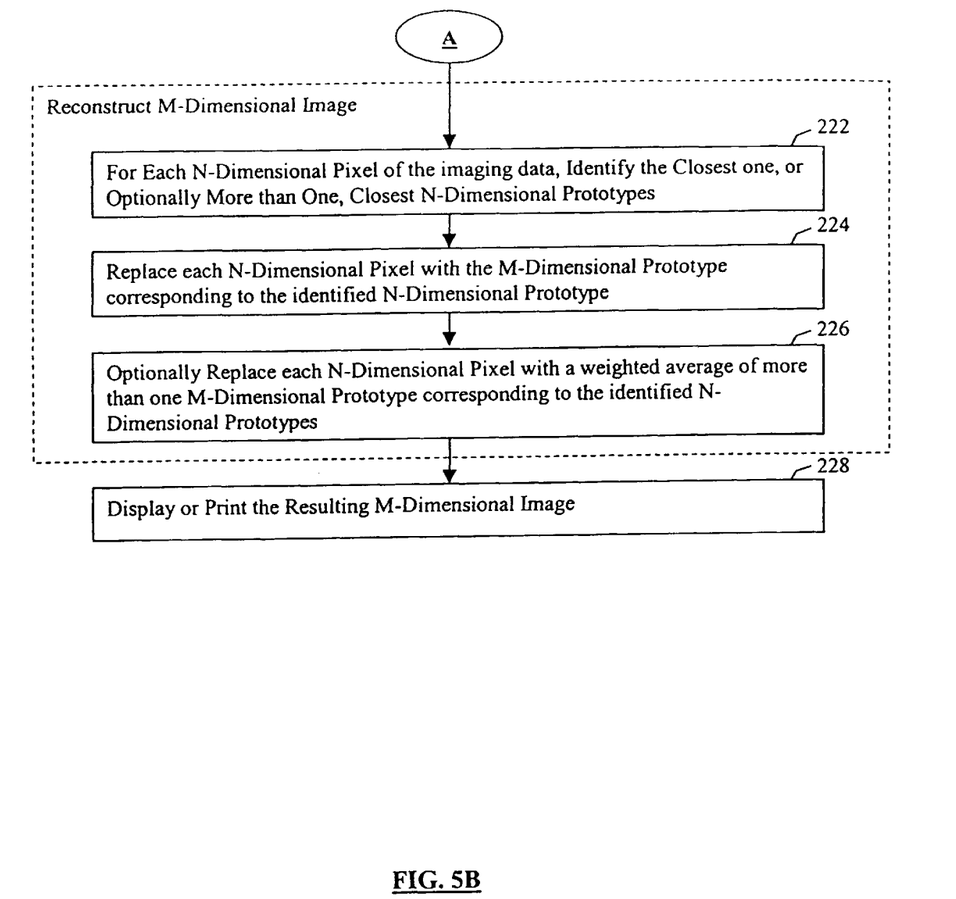

A method of contrast enhancement using an input trained general regression neural network (IT-GRNN), shown in FIG. 4, is depicted in FIGS. 5A and 5B. The method includes three major sections—Clustering by Vector Quantization, Input Training of GRNN, and reconstruction of an M-dimensional image from the N-dimensional original. In image processing applications, some form of clustering of the pixel vectors is desirable so that the pixels can be represented by a smaller number of cluster centers or prototypes than the total number of pixels in an image. The number of prototypes determines the number of pattern neurons in FIG. 4. So far, it has been found that 200–1000 cluster centers work well to represent images containing one million pixels. The preferred clustering technique is vector quantization, shown in steps 200–204, but any other clustering technique may be used, including, for example, K-means clustering.

In step 200, the image processor 10 retrieves N-dimensional pixel values from an input source, which may be the camera 12, the database 14 or the network 16. In step 202, the image processor 10 determines a smaller number of N-dimensional prototypes representative of the pixels. Many techniques may be used in step 202, however, a preferred embodiment follows. Going through all the pixels in any order, compare each pixel with all the entries in the codebook so far. Using as a distance measure the absolute value of the largest of the N component differences from pixel to prototype, discard the pixel if this distance is less than a predetermined threshold. Otherwise, enter the N-dimensional spectral intensity vector of this pixel into the codebook as a new N-dimensional prototype. Keep track of how many pixels are discarded as represented by each prototype. At the end, reduce the codebook by eliminating prototypes which are representative of only a small number of pixels. In step 204, the image processor 10 stores the N-dimensional prototypes in a database as a codebook.

In step 206, the N-dimensional prototypes are applied to configure an IT-GRNN having M inputs and N outputs. FIG. 4 depicts such an IT-GRNN 50. A General Regression Neural Network (GRNN) is a network which is designed to estimate variables given training samples or patterns. A GRNN is described in Specht, D. F., "A General Regression Neural Network," IEEE Trans. Neural Networks, vol. 2, pp. 568–576 (November 1991) which is hereby incorporated by reference herein. Training patterns are M-dimensional vectors of observed variables with N-dimensional vectors of observed responses. In the feed forward operation of a trained GRNN network, new M-dimensional patterns can be applied to the input layer and the network will estimate outputs as a (non-linearly) weighted average of the outputs corresponding to the training patterns. Input training reverses the procedure. The output patterns are known and the question becomes, what input patterns are most likely to have caused these outputs?

Referring to FIG. 4, the IT-GRNN 50 includes an input array 52 of M-dimensional input patterns. The input array 52 feeds M input neurons 54 in the input layer of the IT-GRNN 50. Each of the M input neurons 54 in turn feeds one component of each M-dimensional input to each of a plurality of pattern neurons 56. The pattern neurons 56 are as numerous as the number of N-dimensional prototypes in the codebook that are assigned based on the N-dimensional imaging data. Each pattern neuron 56 stores an M-dimensional prototype as its center, and the corresponding N-dimensional prototype as the set of output weights. Each pattern neuron 56 in turn produces an activation level which is described below. Each pattern neuron 56 multiplies its activation level by its corresponding N-dimensional prototype and feeds this product to the N summation neurons 58. Each pattern neuron also feeds its activation level directly to a summation neuron 59. Each summation neuron 58 in turn sums all of its inputs and feeds the result to a corresponding one of N output neurons 60. The $N+1^{th}$ summation neuron 59 sums all of its inputs and feeds the result to all N output neurons 60. The output neurons 60 each form an estimate of one component of the N-dimensional output vector by division of the value from its corresponding summation unit by the value output by the $N+1^{th}$ summation unit. (See Specht reference for a mathematical derivation of a GRNN technique.) These outputs are stored for comparison with the N-dimensional prototypes. An error block 64 is coupled to the output array 62 and the output neurons 60 and determines an error between each N-dimensional output and the corresponding N-dimensional prototype. The error is then used to adjust the input patterns stored in the input array 52 and the M-dimensional prototypes stored in the pattern neurons 56 to minimize error and thereby enhance color contrast in M-dimensional space.

In step 208, the image processor 10 initializes the M-dimensional prototypes to values which span the input space and which are associated one to one with the N-dimensional prototypes. Each pattern neuron 56 in the pattern layer of the IT-GRNN 50 stores one of the M-dimensional prototypes. Also, each M-dimensional prototype is stored as an M-dimensional training input vector in the input array 52. Furthermore, each corresponding N-dimensional prototype is stored with its pattern unit 56 as a set of output weights.

If in step 208, the image processor 10 arbitrarily assigns each M-dimensional prototype to an N-dimensional prototype, the image resulting after iteration will have increased color contrast as desired, but the resulting colors may also be arbitrary. In particular, if M is 3 and 3 of the N original bands are red, green, and blue, then copying these bands as the initial values will influence the final values so that the final color image resembles a true-color image. Even if the N bands do not contain the visible color bands, it is convenient to take M of the original N bands and use these as the initial inputs. Thus, in the case of M<N, in a preferred embodiment of the invention, a subset of the N vector components becomes the input to the IT-GRNN 50 which is required to output the full N-dimensional vector.

In step 210, the input training of the IT-GRNN 50 begins. In step 210, one of the input training vectors is presented to the IT-GRNN 50 from the array 52 via the input neurons 54. In response, each pattern neuron 56 measures the distance between it and its stored M-dimensional prototype vector and responds with an activation level based on the distance.

The activation level is typically derived based on an arithmetic function of the inputs to the neuron and typically has output values that are mathematically constrained to the range of 0–1 for convenience. However, the range 0–1 is arbitrary and any convenient range may be used. In a preferred embodiment of the invention, the activation level corresponds to exp (−distance/sigma) or exp −(distance/sigma)$^2$. The activation level of each neuron multiplied by the corresponding component of the N-dimensional prototype is fed to N summation neurons 58 which in turn feed N output neurons 60. The activation level of each neuron is also fed without modification to the N+1$^{st}$ summation neuron 59. The influence of a particular neuron in the estimation of the output vector is proportional to this activation level. It is desired that the input for a particular neuron, when applied to the input of the entire network 50, will cause a network response corresponding to that input to be equal to the corresponding N-dimensional prototype. If sigma is small (and there are no duplicate input vectors) this will happen because the activation of the corresponding neuron will be close to 1.0 and the activation levels of all the other neurons will be negligible. If sigma is large enough to allow more than one neuron to have a significant level of activation, then the output of the network 50 will not be precisely the desired output.

In step 212, the image processor 10 measures the squared error of the N-dimensional output. This can be computed for prototype i by the following code fragment (written in the C language):

```
error=0;
for (k=0;k<N;k++) numerator[k]=0.0;
denom=0.0;
for (j=0;j<ncbe;j++) {/*where ncbe = number
  of codebook entries */
  dist = 0.0;  /*distance between M-dim inputs i and j */
  for (k=0;k<M;k++) dist+=abs (inputs[k] [i]-inputs[k] [j]);
  dist = exp (-dist/SIGMA);
  for (k=0;k<N;k++) numerator[k]+=codebook[k] [j]*dist;
  denom += dist ;
} /* end j */
if (denom<=0) denom = 1.0:
for (k=0;k<N;k++) {
  err = (double) codebook[k] [i]-numerator [k]/denom;
  error += fabs (err);
} /* error complete for prototype i */
```

In step 214, the image processor perturbs each of the M inputs to find the derivative of error. Then in step 216, the image processor 10 changes each component of the applied M-dimensional prototype a small amount in the direction opposite to the gradient (to minimize the error). The image processor 10 then moves the center of the pattern neuron 56 to correspond to the values of the M-dimensional prototype. In step 218, the image processor 10 determines whether the last pattern has been applied. If not, then step 210 begins again for the next pattern. If the last pattern has been applied then step 220 begins. In step 220, the image processor determines whether the last iteration has been performed. If so then step 222 of FIG. 5B begins. If not, then the image processor 10 starts another iteration of input training in step 210 beginning with the first training pattern in the array 52.

The input training technique is iterative. Suppose that the number of cluster centers or prototypes in the vector quantization codebook is ncbe (number of codebook entries). Then there will be ncbe neurons in the pattern layer of the GRNN network. It is necessary to set initial locations for these prototype layer neurons 56. The locations will also be the initial input vectors. The initial locations are modified or spread as a result of iteration to span the entire input space-the entire color palette when M=3.

A pattern or M-dimensional prototype which is isolated will have no error; error is generated by the influence of other neurons which are close in input vectors but have different N-dimensional response requirements. Paradoxically, it is desirable to have sigma large enough so that there is interference from neighboring pattern neurons 56. The network will then arrange to have the most compatible pattern neurons 56 move towards one another in M-dimensional space in order to have the incompatible ones more separated. After sufficient iteration the following good results will be evident: (1) small changes in the output vector don't result in sudden large changes in the input vector; (2) the input vectors will be widely dispersed in the input space because the error minimization criterion forces the neurons to be as far apart from each other as possible; and (3) similar patterns won't use up as much of the available dynamic range as dissimilar patterns because they can be packed closer together without causing large errors.

The result of steps 206 to 220 is a mapping between the N-dimensional prototypes and the M-dimensional prototypes which have been spread out within the M-dimensional space to enhance contrast. In steps 222 to 226, an M-dimensional image is reconstructed based on the mapping and the N-dimensional pixel data. In step 222, for each N-dimensional pixel of the imaging data, the image processor 10 identifies the closest one (or optionally more than one) N-dimensional prototype(s). This is typically done based on a distance criteria. In step 224, the image processor 10 replaces each N-dimensional pixel with the M-dimensional prototype corresponding to the identified N-dimensional prototype. In step 226, when a smoother reconstruction is desired, the image processor optionally replaces each N-dimensional pixel with a weighted average of more than one M-dimensional prototype corresponding to the identified N-dimensional prototypes. The reconstruction is smoother because mapping in step 224 necessarily maps each pixel into one of ncbe color combinations. A weighted average of two or more color combinations vastly increases the number of possible colors in the resultant image. If for a particular pixel the two closest prototypes are numbered min1 and min2 and the corresponding distances are mindist1 and mindist2, a convenient code fragment combining them is the following in C programming language code:

```
total = mindist1 + mindist2 ;
if (total<=0) {
  for (k=0;k<M;k++) newpixel [k]=inputs[k] [min1] ;}
if (total>0) {
  for (k=0;k<M;k++) {
    ave = (mindist2*inputs[k] [min1]
    +mindist1*inputs [k] [min2]) /total ;
    newpixel[k]=ave ; }
}
```

In step 228, the image processor 10 displays on the monitor 20 or prints on the printer 18 the resulting M-dimensional image.

In one embodiment, in step 210, each M-dimensional prototype may be selected based on a genetic algorithm. Then in step 212, the error measurement would remain the same. In steps 214 and 216, instead of using gradient descent to find the next M-dimensional vector to try, genetic algorithms may be applied to keep good parent prototypes and try new offspring prototypes. The M-dimensional prototypes resulting in the least error would be retained.

IT-BPNN Neural Network Implementation

Figure 6:
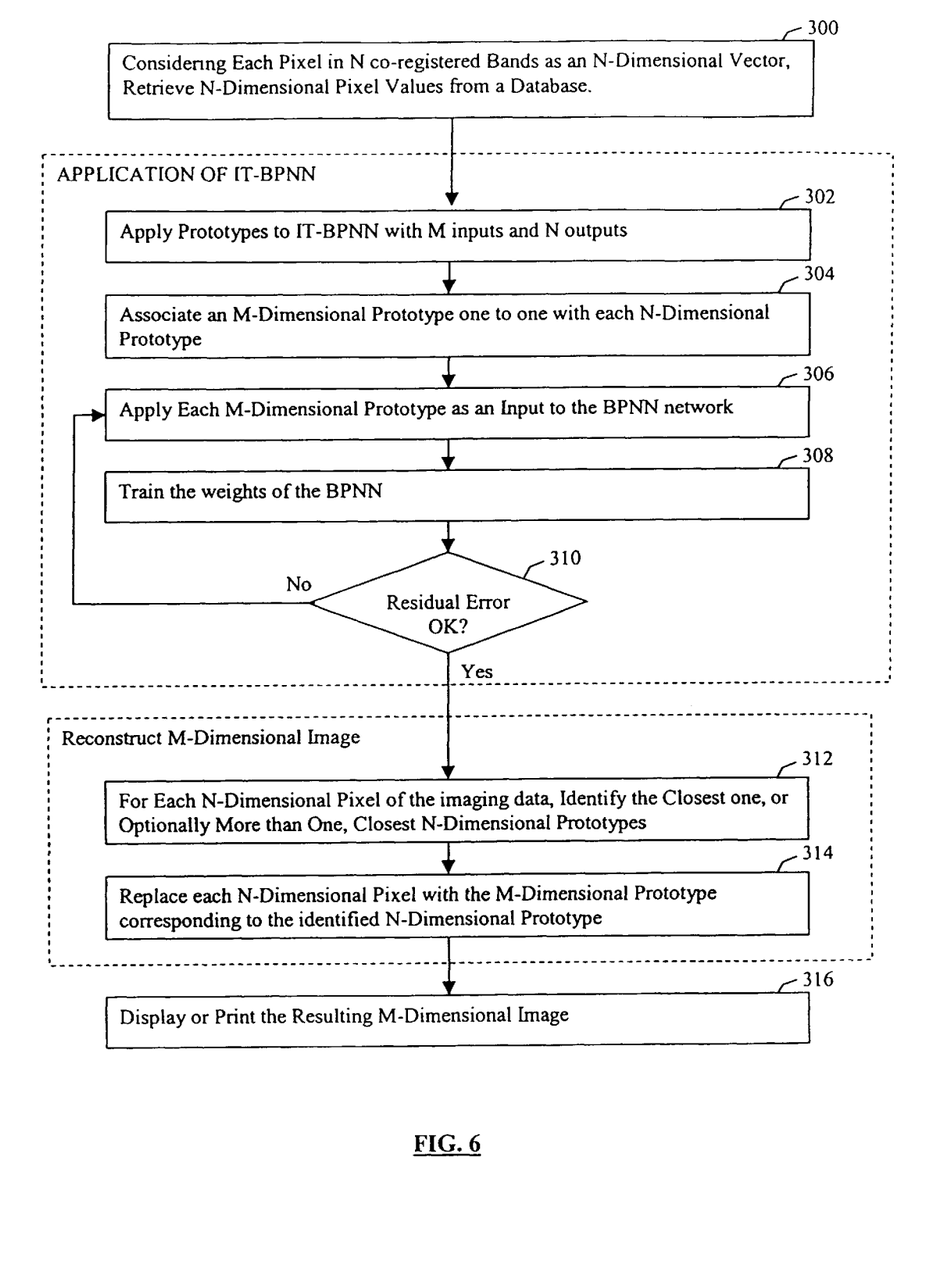
FIG. 6 depicts a method of converting an image of N spectral bands to M color bands using an IT-BPNN.

FIG. 6 depicts a method of enhancing contrast by input training using a back propagation neural network (IT-BPNN). In step 300, the image processor 10 retrieves N-dimensional pixel values from a database. In step 302, the N-dimensional pixel values or a smaller number of prototypes are applied to set up an IT-BPNN with M inputs and N outputs. In step 304, the image processor 10 assigns M-dimensional input vectors for each N-dimensional prototype. Then in step 306, each of the M-dimensional input vectors is applied as an input to the BPNN network. In step 308, the weights of the IT-BPNN are trained as described in Shufeng Tan and Michael L. Mavrovouniotis, "Reducing Data Dimensionality through Optimizing Neural Network Inputs," AIChE Journal, 41,6 (June 1995) and Rumelhart, Hinton, and Williams, "Learning Internal Representations by Error Propagation," Chapter 8 *Parallel Distributed Processing, Volume* 1: *Foundations,* Rumelhart, McClelland, and the PDP research group, MIT Press, Cambridge, Mass., 1987, which are hereby incorporated by reference herein.

In step 310, the image processor determines whether a residual error between the network inputs and expected outputs is acceptable. The acceptable error is typically a predetermined level which affects the number of iterations of input training. If not, then step 306 begins again. If so, then step 312 begins. In step 312, the closest N-dimensional prototype(s) to each pixel are identified. Then in step 314, the image processor 10 replaces each N-dimensional pixel with the M-dimensional vector corresponding to the identified N-dimensional prototype(s). Just as in the previous section, a smoother representation can be obtained by replacing each pixel with a weighted average or other interpolation based on two or more closest prototypes. In step 316, the image processor 10 displays on the monitor 20 or prints on the printer 18 the resulting M-dimensional image.

AANN Neural Network Implementation

Figure 7A:
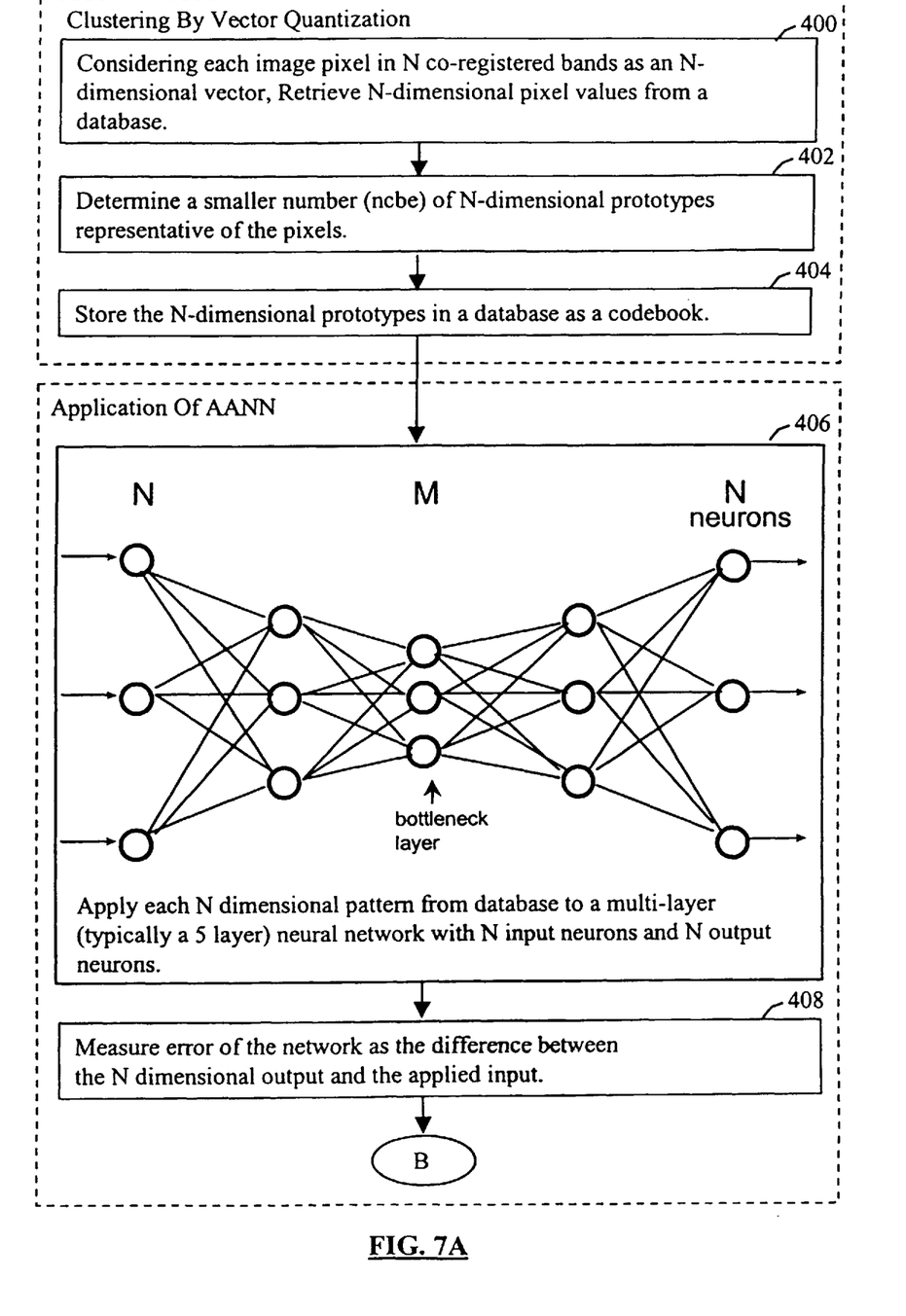
FIGS. 7A and 7B depict a method of converting an image of N spectral bands to M color bands using an AANN.
Figure 7B:
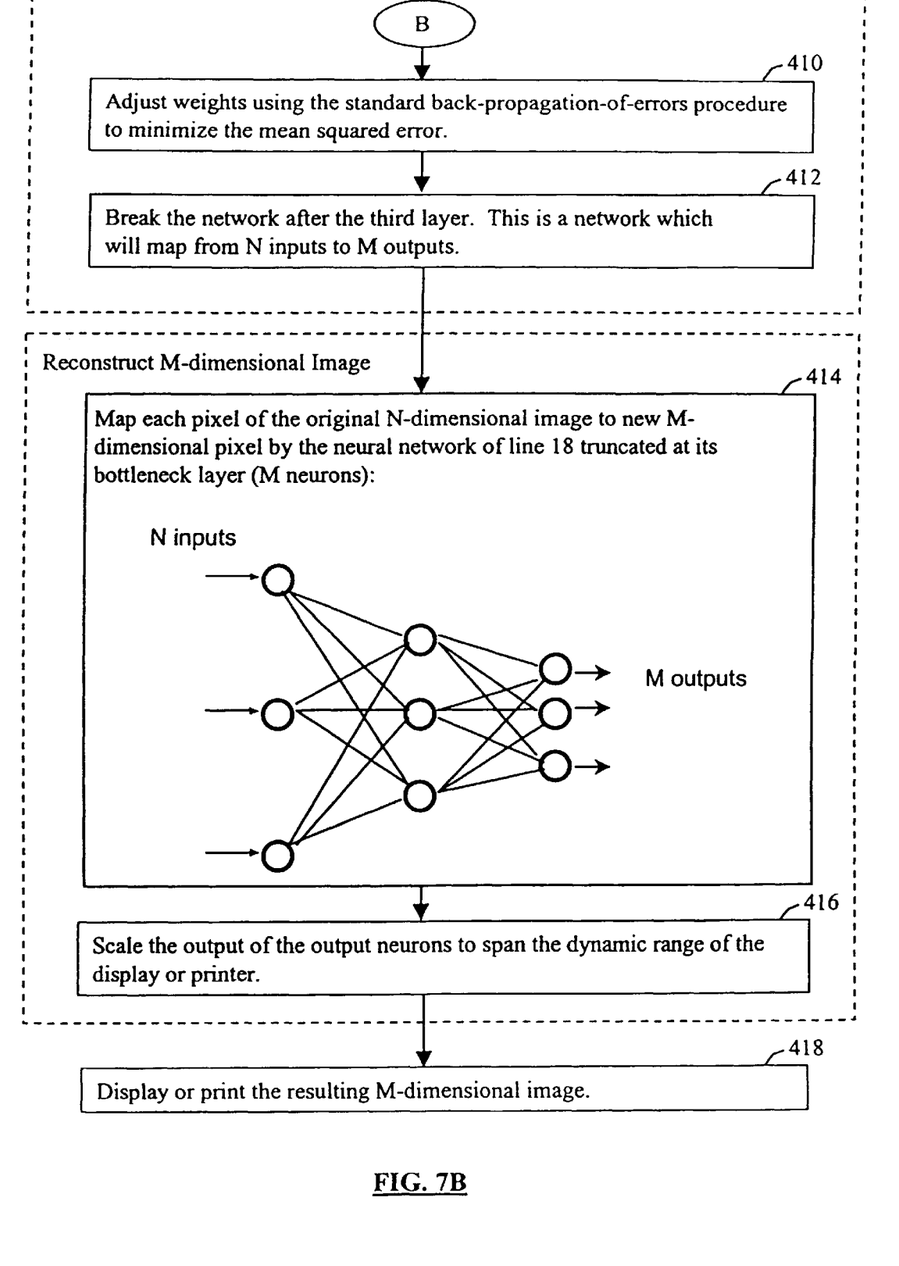

FIGS. 7A and 7B depict a method to enhance image contrast using an auto associative neural network (AANN) according to the present invention. Steps 400–404 operate in the same manner as steps 200–204. In step 406, the image processor 10 applies each N-dimensional prototype from the database to a multi-layer neural network with N input neurons and N output neurons. A multi-layer (typically 5 layer) Perceptron configuration is used wherein a middle layer has a fewer number of neurons (M) than the input and output layers which have the same number N of neurons. The middle layer is called the bottleneck layer. The multi-layer network may include more or less than 5 layers depending on the application.

In step 408, the image processor 10 measures the error of the network as the difference between the N-dimensional output of the network and the applied input. Then in step 410, the image processor 10 adjusts weights using the standard back-propagation-of-errors procedure to minimize the mean squared error. The neural network literature is replete with modifications to the standard back propagation procedure to speed convergence. Any of these can also be used.

In step 412, the image processor breaks the network after the bottleneck layer. The result is a network which maps from N inputs to M outputs. The outputs of each neuron are computed based on the inputs or the outputs of the previous layers.

In step 414, the image processor maps each pixel of the original N-dimensional image to a new M-dimensional pixel determined by the neural network truncated at its bottleneck layer, which has M neurons. In step 416, the image processor 10 scales the output of the network to span the dynamic range of the display or printer. For the purposes of mapping each pixel, it is not necessary to compute the output of the layers beyond the bottleneck layer. Instead, it will usually be necessary to re-scale the output of the bottleneck layer because the data has been offset and normalized to a fixed range probably different from the range of values used by the monitor or printer. Typically the fixed range of the "hidden" (not output) neurons is 0.0 to 1.0 whereas the desired output range is a fixed-point number from 0 to $2^n-1$. In step 418, the image processor 10 displays or prints the resulting M-dimensional image on a monitor 20 or printer 18, respectively.

With the AANN, the image processor 10 presents each pattern to the input to train the network so that the same pattern is replicated at the output with minimum error in spite of the fact that the data must be transmitted through the bottleneck layer. To the extent that the input data are redundant, this is possible. In this case, most of the non-redundant data is contained in the M-dimensional vector available at the bottleneck layer. When M is three, this data can all be displayed on a standard color monitor or printer.

Selection Among the Neural Networks

The three neural network methods described have different contrast enhancement attributes. For example, IT-GRNN works for N=M and N>M and is fast running. It favors the initial assignment of M-dimensional prototypes unless the number of iterations is set high enough to approach convergence. If, for example, M is 3 and the assigned spectral bands are red, green, and blue, then the enhanced image typically resembles the true color image. The IT-BPNN method is slower than IT-GRNN, which is the most preferred embodiment and works better when N>M. The AANN method works best for large N and when N>M. It doesn't work well for N=M. The AANN method doesn't favor any particular bands and so the color output may be bizarre even though the contrast is maximized. This effect can be mitigated by choosing the right three outputs or their inverses to go to the R,G,B inputs of the monitor or printer.

Other Techniques Can Be Used For the Spreading Function

Many techniques could be applied to the essential function of spreading pixel data through the full dynamic range of the display space. One that we have tried uses the Kohonen self organizing map to find "bins," analogous to prototypes, which contain equal numbers of pixel vectors in N-dimensional pixel space. If the bin centers are initialized to span the M-dimensional color space, a mapping from the N-dimensional bin centers to the original M-dimensional bin centers accomplishes the desired mapping. Using this technique, N may be greater than or equal to M.

Another method of spreading pixel colors over an M-dimensional space is the use of the Kohonen self-organizing map to find bins in N-dimensional pixel space which are far apart from each other. This technique, unlike that of the previous paragraph, does not require bins to be pushed into the most extreme color combinations. Rather, in this variation, the bin centers are initialized to cluster centers of the pixels. Then, for each iteration, each bin center is moved a small amount away from each other bin center. Key parameters are the number of iterations allowed and the distance of movement with each iteration. This technique is most effective where N=M. If N is greater than M, then M must be selected for the initial display and the algorithm for separating clusters would be applied to only those M dimensions.

Another method applicable when N=M and M>1 is called Perpendicular Expansion. According to this method, the image processor 10 measures the perpendicular distance of each pixel color (or cluster of pixels) to the main color diagonal within the M-dimensional color space. The main diagonal is defined as the locus of points for which the intensities are equal for each of the M colors. The image processor 10 then multiplies the measured distance by a specified factor and spreads the pixel intensities to values specified by moving outward from the main diagonal along the same perpendicular line to the new distance. Any computed intensity value would be limited to the maximum intensity. The image processor 10 then replaces each pixel in the original color image with the computed pixel intensities. This method, when combined with clustering, would be faster than neural network techniques because it is not iterative.

Figure 8:
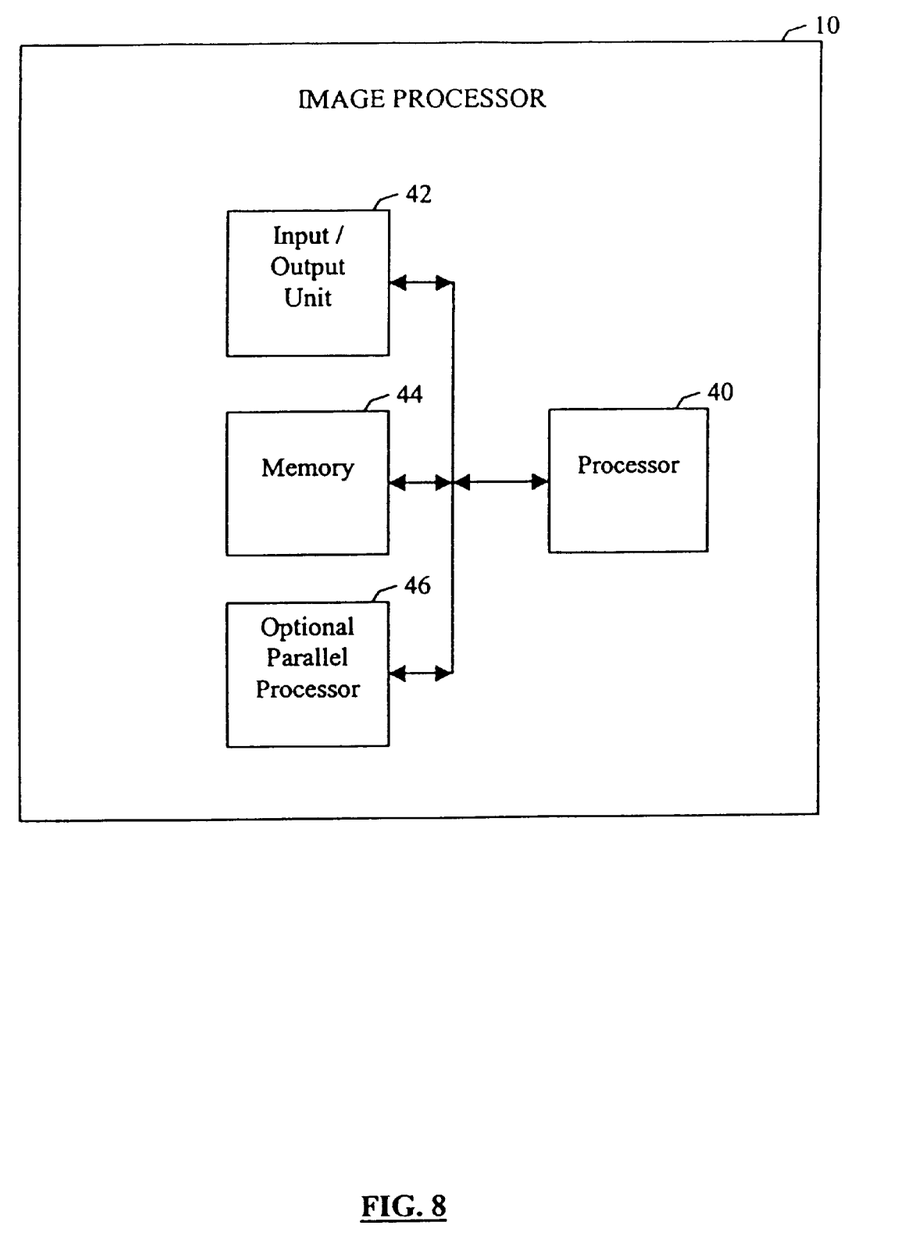
FIG. 8 depicts an internal view of an image processor.

FIG. 8 depicts an internal view of the image processor 10. The image processor 10 includes an input/output unit 42, a memory 44 and an optional parallel processor 46 coupled to a processor 40 over a bus. The input/output unit is used to retrieve pixel data from the camera 12, the database 14 and the network 16. The input/output unit is also used to output pixel data to the database 14, the network 16, the printer 18 and the monitor 20. The memory 44 typically includes both RAM and ROM, and may further include devices for reading computer usable mediums, such as disk drives and CD ROM drives. The memory 44 stores program instructions and data which it may receive from the database 14 or the network 16 through the input/output unit 42. The program instructions may also be received from a computer usable medium, such as a diskette, tape or a CD ROM. The program instructions are executed by the processor 40 to provide image processing according methods described. Optionally, the image processor may include a parallel processor 46. The parallel processor 46 may include a plurality of paralleled processors. Several hundreds, thousands or millions of processors may be implemented on the parallel processor 46 and be advantageously utilized. The parallel processors can be general purpose or specialized to perform neural network computations efficiently. One particular specialized set of neural network parallel processors (from IBM/France) are called ZISC (zero instruction set computer) type processors, in which case, the paralleled processors do not execute program instructions from a memory. Rather, the ZISC parallel processor performs operations on data supplied by the processor 40 using hardware logic. An example of a ZISC chip is the ZISC036 chip available from IBM Corporation, which includes 36 parallel processors. These chips are designed for convenient interconnection on a board for implementation of hundreds of paralleled processors.

Neural networks may be implemented by the processor 40 executing program instructions, where the program instructions define the neural network and the sequence of operational steps necessary for the neural network to operate. Alternatively, a neural network may be implemented using the parallel processor 46 by devoting a processor to each neuron or group of neurons of the neural network in a well known manner.

Although specific embodiments of the invention have been described, one of ordinary skill in the art will realize that changes may be made to those embodiments without departing from the spirit and scope of the invention. For example, although the target image dimensionality has frequently been presented as 3, a variation is to compress 3 bands of color to 1 band of greyscale. This mapping of RGB to black and white may be advantageously used in the printing industry (from newspaper ads to books) to get more information into B&W images. The same process can be used with greyscale computer printers. B&W is commonly used because of cost. The methods of the present invention automatically overcome a problem with conventional color to B&W transformation in which different colors with the same saturation are mapped to the same grey level and are therefore indistinguishable.

The number of layers and the number of neurons in each layer can be varied quite a bit and still achieve the same results. For example, the number of neurons in the first and last layer of the auto-associative neural network must equal N, and the number of neurons in the bottleneck layer must be M. However, the number of neurons in the other layers of the AANN can be any number, but are typically between M and N.

What is claimed is:

1. A method of enhancing visible contrast in an image, comprising the steps of:

retrieving the image, the image including a plurality of pixels, each pixel having N spectral intensities;

assigning N-dimensional prototypes based on the plurality of pixels;

relating each N-dimensional prototype with an M-dimensional prototype;

spreading the related M-dimensional prototypes through a dynamic range in M dimensions; and creating an enhanced image having based on the N spectral intensities of each pixel, the N and related M-dimensional prototypes;

wherein N>M or (N=M and M>1).

2. The method according to claim 1, wherein the assigning step comprises:

clustering pixels from the plurality of pixels into N-dimensional clusters based on similarity of spectral intensities in the N dimensions; and assigning one of the N-dimensional prototypes to each N-dimensional cluster.

3. The method according to claim 2, wherein the clustering step is performed based on vector quantization.

4. The method according to claim 2, wherein the clustering step is performed based on K-means clustering.

5. The method according to claim 1, wherein the assigning step comprises:

assigning one of the N-dimensional prototypes for each pixel having unique N spectral intensities.

6. The method according to claim 1, further comprising the step of displaying the enhanced image on a display.

7. The method according to claim 1, further comprising the step of printing enhanced image on a printer.

8. The method according to claim 1, further comprising the step of storing the enhanced image in a database.

9. The method according to claim 1, further comprising the step of transmitting the enhanced image over a network.

10. The method according to claim 1, wherein the spreading step is performed using a neural network.

11. The method according to claim 1, wherein the spreading step is performed based on input training using a general regression neural network.

12. The method according to claim 1, wherein the spreading step is performed based on input training using a back propagation neural network.

13. The method according to claim 1, wherein the spreading step is performed based on an auto associative neural network.

14. The method according to claim 1, wherein the spreading step is performed based on Kohonen self organizing maps.

15. The method according to claim 1, wherein the spreading step is performed based on perpendicular expansion.

16. The method according to claim 1, wherein the spreading step is performed based on fuzzy logic.

17. The method according to claim 1, wherein the spreading step continues until substantial histogram equalization in M dimensions is achieved.

18. The method according to claim 11, wherein the M-dimensional prototypes are selected based on genetic algorithms.

19. An apparatus for improving the contrast of images, comprising:
   an input unit for receiving an image, the image including pixels each having N spectral intensities;
   an output unit for transmitting an enhanced image, the enhance image having M color dimensions where N>M or (N=M and M>1);
   memory, coupled to the input/output unit, the memory storing program instructions and imaging data; and
   a processor, coupled to the memory, the input and the output units, the processor executing the program instructions and in response the processor retrieving the image from the input unit, assigning N-dimensional prototypes based on the pixels of the image, relating each N-dimensional prototype with an M-dimensional prototype, spreading the related M-dimensional prototypes through a dynamic range in M dimensions; and creating the enhanced image based on the N spectral intensities of each pixel, the N-dimensional prototypes and the related M-dimensional prototypes.

20. The apparatus according to claim 19, wherein the processor spreads the M-dimensional prototypes using a neural network.

21. The apparatus according to claim 19, wherein the processor spreads the M-dimensional prototypes based on input training using a general regression neural network.

22. The apparatus according to claim 19, wherein the processor spreads the M-dimensional prototypes based on input training using a back propagation neural network.

23. The apparatus according to claim 19, wherein the processor spreads the M-dimensional prototypes based on an auto associative neural network.

24. The apparatus according to claim 19, wherein the processor spreads the M-dimensional prototypes based on Kohonen self organizing maps.

25. The apparatus according to claim 19, wherein the processor spreads the M-dimensional prototypes based on perpendicular expansion.

26. The apparatus according to claim 19, wherein the processor spreads the M-dimensional prototypes based on fuzzy logic.

27. The apparatus according to claim 19, wherein the processor continues to spread the M dimensional prototypes until substantial histogram equalization in M dimensions is achieved.

28. The apparatus according to claim 19, further comprising a camera coupled to the input unit for capturing the image.

29. The apparatus according to claim 19, further comprising a monitor coupled to the output unit for displaying the enhanced image.

30. The apparatus according to claim 29, further comprising a printer coupled to the output unit for printing the enhanced image.

31. The apparatus according to claim 21, wherein the M-dimensional prototypes are selected based on genetic algorithms.

32. A computer program product for causing an image processor to enhance visible contrast in an image, the image including a plurality of pixels, each pixel having N spectral intensities, comprising a computer useable medium having computer program logic stored therein, wherein the computer program logic comprises:
   assigning means for causing the image processor to assign N-dimensional prototypes based on the plurality of pixels;
   relating means for causing the image processor to relate each N-dimensional prototype with an M-dimensional prototype;
   spreading means for causing the image processor to spread the related M-dimensional prototypes through a dynamic range in M dimensions; and
   creating means for causing the image processor to create an enhanced image having M color dimensions based on the N spectral intensities of each pixel, the N-dimensional prototypes and the related M-dimensional prototypes; wherein N>M or (N=M and M>1).

33. The computer program product according to claim 32, wherein the spreading means causes the image processor to spread the M-dimensional prototypes using a neural network.

34. The computer program product according to claim 32, wherein the spreading means causes the image processor to spread the M-dimensional prototypes based on input training using a general regression neural network.

35. The computer program product according to claim 32, wherein the spreading means causes the image processor to spread the M-dimensional prototypes based on input training using a back propagation neural network.

36. The computer program product according to claim 32, wherein the spreading means causes the image processor to spread the M-dimensional prototypes based on an auto associative neural network.

37. The computer program product according to claim 32, wherein the spreading means causes the image processor to spread the M-dimensional prototypes based on Kohonen self organizing maps.

38. The computer program product according to claim 32, wherein the spreading means causes the image processor to spread the M-dimensional prototypes based on perpendicular expansion.

39. The computer program product according to claim 32, wherein the spreading means causes the image processor to spread the M-dimensional prototypes based on fuzzy logic.

40. The computer program product according to claim 32, wherein the spreading means causes the image processor to continue to spread the M dimensional prototypes until substantial histogram equalization in M dimensions is achieved.

41. The computer program product according to claim 32, wherein the computer program logic further comprises capturing means for causing the image processor to capture the image from a camera.

42. The computer program product according to claim 32, wherein the computer program logic further comprises output means for causing the image processor to output the enhanced image to one of a monitor and a printer.

43. The computer program product according to claim 34, wherein the M-dimensional prototypes are selected based on genetic algorithms.

* * * * *